Figures 1, 2:
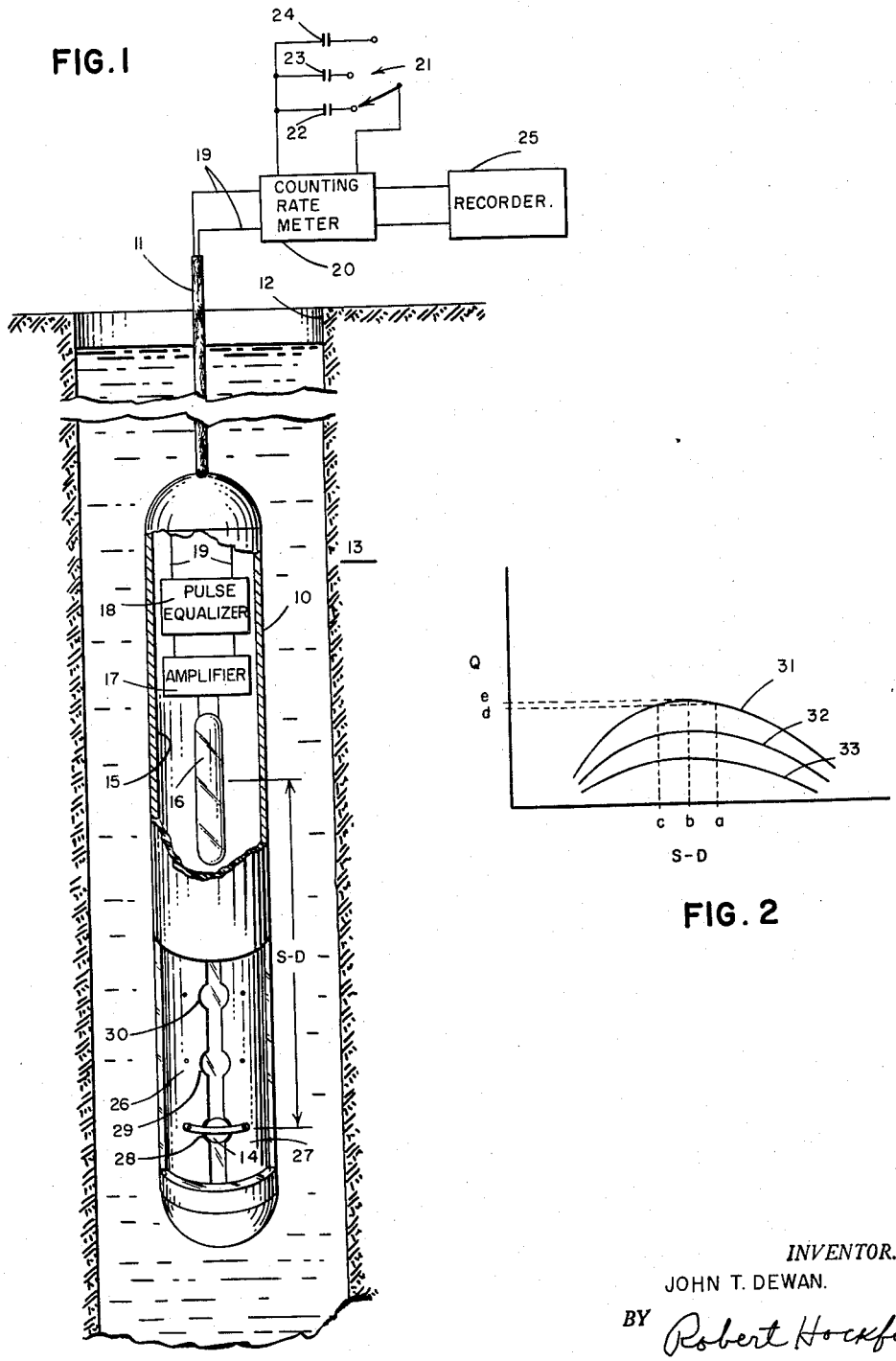

Sept. 20, 1960     J. T. DEWAN     2,953,685

WELL LOGGING

Filed June 16, 1955

INVENTOR.
JOHN T. DEWAN.
BY Robert Hockfield
HIS ATTORNEY

United States Patent Office 2,953,685
Patented Sept. 20, 1960

2,953,685
WELL LOGGING

John T. Dewan, Houston, Tex., assignor, by mesne assignments, to Schlumberger Well Surveying Corporation, Houston, Tex., a corporation of Texas Filed June 16, 1955, Ser. No. 515,943

6 Claims. (Cl. 250—83)

This invention relates to well logging and, more particularly, pertains to a new and improved method of utilizing a logging instrument of the type including a source of radiant energy for irradiating earth formations and a detector of the radiant energy resulting from such irradiation.

As used herein, the term radiant energy is intended to denote particle energy as well as wave energy. However, for convenience, the invention will be described as applied to a logging instrument including a source of particle energy, such as neutrons, and a detector of wave energy, as gamma radiation.

Under present techniques of oil production where boreholes on the order of eight inches in diameter are commonly drilled, conventional radioactivity logging instruments of the neutron-gamma ray type are generally satisfactory. These instruments usually have a neutron source comprised of a mixture of radium and beryllium which emits an extremely high flux of gamma radiation. Nevertheless, since there is ample space in the instrument, it is possible to accommodate the necessary amount of lead shielding to prevent the gamma rays emitted by the source from masking the detected gamma radiation induced in the formations under neutron bombardment.

It has been proposed that radioactivity logging instruments be arranged to be passed through a well in which tubing has been set, the tubing being on the order of two inches in diameter. Moreover, new techniques of oil production call for smaller boreholes. Consequently, conventional equipment having a lateral dimension of approximately four inches cannot be used for the intended purposes. In addition, since the usual neutron source is an intense gamma ray emitter, it is not possible to employ enough lead shielding in an instrument small enough for these new applications.

Although gamma ray-free neutron sources are available, these may not be entirely satisfactory. For example, a mixture of polonium and beryllium may be employed, but its useful life is relatively short; i.e. it decays to one-half strength in one hundred forty days.

It is, therefore, an object of the present invention to provide a new and improved method of utilizing a radioactivity logging instrument which overcomes, at least in part, the deficiencies inherent in a rapidly-decaying source of radiant energy.

Another object of the present invention is to provide a new and improved method of utilizing a neutron-gamma ray logging instrument having a rapidly-decaying neutron source so as to permit the instrument to be used over a longer period than heretofore possible without replenishing the source.

These and other objects of the invention are attained in radioactivity logging apparatus by decreasing, with time, the spacing between a source of radiant energy and an element of a detection system that is responsive to radiant energy induced in earth formations by the source. Accordingly, the output of the detection system due to induced radiant energy may be increased thereby to preclude the detector output from becoming more representative of the radiant energy naturally occurring in the formations. If desired, a characteristic of the detector system, such as its speed of response, may be altered at the same time the spacing is changed to obtain a desired figure of merit for the apparatus.

The novel features of the present invention are set forth with particularity in the appended claims. The present invention, both as to its organization and manner of operations, together with further objects and advantages thereof, may best be understood by reference to the following description taken in connection with the accompanying drawing in which:

Fig. 1 is a schematic representation of radioactivity logging apparatus especially adapted to the method of utilization embodying the present invention; and Fig. 2 illustrates certain characteristics of the apparatus shown in Fig. 1 useful in explaining a preferred mode of carrying out the invention.

As shown in Fig. 1 of the drawing, radioactivity logging apparatus to which the method of utilization in accordance with the present invention may be applied comprises a carrier 10 suspended by a cable 11 in a borehole 12 traversing earth formations 13. The cable may be employed together with a conventional winch to lower and raise the carrier 10 in the borehole in the customary manner.

Disposed at the lower end of carrier 10 is a source 14 of radiant energy, such as a mixture of polonium and beryllium. Thus, earth formations 13 may be irradiated with neutrons thereby to induce gamma radiation as a result of well-known phenomena. The intensity of such induced gamma radiation is, in general, indicative of hydrogen content of the formations and thus is representative of formation porosity.

To derive indications of the induced radiant energy, there is provided within a fluid-tight housing section 15 of carrier 10, a portion of a gamma ray detection system comprised, for example, of a Geiger-Mueller tube 16 producing pulses whose rate of occurrence represents the intensity of the gamma ray flux incident thereon. Tube 16 is coupled to an amplifier 17, in turn, coupled to a pulse equalizer 18. Accordingly, pulses of uniform amplitude and duration are supplied over conductors 19 of cable 11 to a counting rate meter 20 at the surface of the earth.

The speed of response, or the time constant, of counting rate meter 20 may be varied by means of a selector switch 21 that is employed to connect any of a plurality of condensers 22—24 of different capacitance values in the meter circuit. This type of arrangement is well-known and hence a detailed description is deemed unnecessary.

Meter 20 derives a voltage having a magnitude dependent upon the time rate of occurrence of the pulses supplied to it and this voltage is applied to recorder 25. The recording medium in recorder 25 is transported in proportion to movement of carrier 10 through borehole 12 so that a continuous log is obtained.

Source 14 is composed of a polonium-beryllium mixture and as is well understood, it emits essentially no gamma radiation. Consequently, a gamma ray shield is not required for detector 16. However, the neutron output of the source decreases relatively quickly; i.e. its half-life is 140 days. Since the neutron flux available for irradiating the formation becomes smaller, the induced gamma radiation decreases with time and eventually, after a number of logging operations, naturally-occurring gamma radiation may become undesirably important in the indications produced by recorder 25.

Therefore, in accordance with the present invention, provision is made for altering the spacing between the source and detector, denoted S—D in Fig. 1. To this end, housing 10 includes a pair of side rails 26, 27 that extend downwardly from housing section 15 and a plurality of receptacles 28—30 are supported between the side rails 26, 27. As shown in Fig. 1, for a source at maximum strength, receptacle 28 is employed providing a maximum S—D spacing. After the source decays, the spacing may be decreased to the smaller values provided by receptacles 29 or 30 and, within limits, the counting rate may be restored. This may be more easily understood from the following discussion.

Currently accepted theory indicates that the ability of a logging instrument of the neutron-gamma type to depict formation porosity depends on the distance S—D. Stated very generally, there is a spacing called the crossover point at which no change in counting rate occurs as the porosity changes. Within the crossover, counting rates increase with porosity, outside the crossover counting rates decrease with porosity. Moreover, it has been understood that the source-detector spacing, once determined, should remain fixed on the theory that this would undesirably change that porosity resolution; i.e. the ability of the apparatus to distinguish a change in porosity.

The foregoing analysis, while entirely correct, does not take into account a particular figure of merit of a logging system. This figure of merit relates to the ability of the system to produce accurate indications considering porosity resolution, as well as the statistical uncertainty of any reading. The porosity resolution, R, may be defined as follows:

$$R = \frac{dN}{dP} \cdot \frac{1}{N} \quad (1)$$

where N is the average counting rate and $dN/dP$ is the change in counting rate per change in porosity. The statistical uncertainty, S, is proportional to:

$$\frac{1}{\sqrt{TN}} \quad (2)$$

where T is the time constant of the detection system and N is as defined above. It is possible to define a figure of merit, Q, which increases with porosity resolution and decreases with statistical uncertainty, i.e.:

$$Q = \frac{\frac{dN}{dP} \cdot \frac{1}{N}}{\frac{1}{\sqrt{TN}}} \quad (3)$$

It will be observed that the numerator of Equation 3 is independent of N, while its denominator depends on N and T. Moreover, although the figure of merit can be increased by increasing the time constant T, the logging speed must be reduced to accommodate such a change.

In Fig. 2, there are plotted three curves 31, 32 and 33 representing Q versus S—D for three, progressively lower, source strengths. Obviously, in each case, Q is zero when S—D is at the crossover point as well as when S—D is so great that no induced radiation reaches the detector. These curves exhibit relatively flat regions and thus substantial variations in S—D may be tolerated while maintaining Q close to its maximum values. Accordingly, N may be adjusted within desired limits.

Let it be assumed that with source 14 at maximum strength and in receptacle 28, the spacing is as represented by letter "a" in Fig. 2 and a value of Q denoted "d" is obtained. As the source decays with time, after a given number of days, the neutron output may be such that at spacing "a," curve 32 is applicable. The source 14 may then be moved to receptacle 29 providing a spacing "b" such that the average number of counts, N, is restored. This places the apparatus in an operating condition represented by the intercept between the distance line "b" and curve 32. To bring it to curve 31, switch 21 is manipulated, thereby connecting a larger condenser 23, in place of condenser 22, in circuit with the counting rate meter. By so increasing the time constant T, a figure of merit "e" is obtained which is only slightly different from the value "d."

Similarly, after another period of time receptacle 30 may be employed to achieve spacing "c" and restore N to a selected value. At the same time, condenser 24 is placed in circuit with the counting rate meter and thus the apparatus is in the operative condition represented by the intersection between spacing line "c" and curve 31 to achieve a figure of merit essentially equal to "d."

It is evident that throughout the foregoing operations, the figure of merit remains essentially constant. Of course, any variations in porosity resolution may be accommodated by providing suitable interpretation charts for each of the several S—D distances.

Therefore, a method of utilizing neutron-gamma ray logging apparatus in accordance with the present invention obviates the deficiencies inherent in the use of a rapidly decaying source and permits the source to be employed much longer than otherwise possible.

In a practical example, making use of the present invention, the following parameters were successfully employed:

Maximum diameter of carrier 10—1 11/16 inches
Initial strength of Po—Be source—5 curies

| Elapsed Time | Spacing (S—D) | Time Constant |
| --- | --- | --- |
| 0 | 22 inches | 1 second. |
| 140 days | 19 inches | 2 seconds. |
| 280 days | 16 inches | 4 seconds. |

From the foregoing table, it may be seen that in accordance with the present invention, the spacing S—D is altered inversely with time. In addition, the time constant may be changed directly with time.

If desired, the number of different spacings that may be employed may be increased by providing additional, suitably positioned receptacles. Thus, the incremental changes in spacing may be smaller than in the above example, and alterations in spacing can be made more frequently.

Although the invention has been described in connection with a system including a source of neutrons and a detector of gamma radiation, the method may be applied to a system in which the source emits high energy neutrons and the detector responds to resulting radiation in the form of neutrons slowed to lower energies, as in the thermal range.

Obviously, the invention may be equally applicable to a system including a polonium-beryllium source as well as other rapidly decaying sources.

While a particular embodiment of the present invention has been described, it is apparent that changes and modifications may be made without departing from this invention in its broader aspects, and therefore the aim in the appended claims is to cover all such changes and modifications as fall within the true spirit and scope of this invention.

I claim:

1. A method of utilizing well logging apparatus including a source providing radiant energy varying with time and a detection system having an element responsive to radiant energy resulting from radiation of earth formations by said source, said element providing a pulse-type signal wherein the rate of occurrence of pulses is dependent upon the intensity of incident radiant energy, which comprises the steps of: establishing an initial spacing between said source and said element of said detection system providing a given rate of occurrence of the pulses in the signal from said element for a reference condition; altering the spacing between said source and said element of said detection system in one direction progressively with time to maintain said given rate of occurrence substantially constant; and altering the speed of response of said detection system in the opposite sense.

2. A method of utilizing well logging apparatus including a source providing radiant energy varying with time and a detection system having an element responsive to radiant energy induced in earth formations by said source which comprises the steps of: establishing an initial spacing between said source and said element of said detection system; decreasing the spacing between said source and said element of said detection system progressively with time; and altering the speed of response of the detection system to compensate for decrease in such spacing.

3. A method of utilizing well logging apparatus including a source providing radiant energy varying with time and a detection system having an element responsive to radiant energy induced in earth formations by said source which comprises the steps of: establishing an initial spacing between said source and said element of said detection system; decreasing the spacing between said source and said element of said detection system in predetermined incremental steps progressively and at selected intervals of time; and altering the speed of response of the detection system to compensate for a decrease in such spacing.

4. A method of utilizing well logging apparatus including a source providing radiant energy varying with time and a detection system having an adjustable speed of response and having an element responsive to radiant energy induced in earth formations by said source which comprises the steps of: establishing an initial spacing between said source and said element of said detection system and an initial speed of response for said detection system; altering the spacing between said source and said element of said detection system progressively and in an inverse sense with time; and altering said speed of response for said detection system directly as a function of time.

5. A method of radioactivity logging comprising the steps of decreasing the spacing of a decaying source of radiant energy with respect to a detector included in a radiant energy detector system by a predetermined amount dependent upon the elapsed life of the source, moving the source and detector system through a well at a given logging speed to derive pulses at a rate indicative of a property of the formations traversed, obtaining indications of the pulse rate of the detector system, and altering the time constant of the detector system an amount dependent upon the logging speed to compensate for decrease in such spacing.

6. A method of radioactivity logging comprising the steps of decreasing the spacing of a decaying source of radiant energy with respect to a detector included in a radiant energy detector system by one or more predetermined increments dependent upon the elapsed life of the source, altering the time constant of the detector system by an amount dependent on the decrease in the source-detector spacing, moving the source and detector system through a well at a given logging speed dependent upon the time constant to derive pulses at a rate indicative of a property of the formations traversed, and obtaining indications of the pulse rate of the detector system.

References Cited in the file of this patent

UNITED STATES PATENTS

| | | |
|---|---|---|
| 2,469,462 | Russell | May 10, 1949 |
| 2,515,501 | Fearon et al. | July 18, 1950 |
| 2,727,155 | Herzog et al. | Dec. 13, 1955 |